EDWARD G. SHORTT.

Improvement in Methods of Fastening Pulley and Wheel Hubs to Shafts.

No. 116,228. Patented June 20, 1871.

Witnesses: Inventor:
E. G. Shortt.
per
Attorneys.

UNITED STATES PATENT OFFICE.

EDWARD G. SHORTT, OF CARTHAGE, NEW YORK, ASSIGNOR TO HIMSELF, LEVI WOOD, MINOR GUYOT, GEORGE GILBERT, AND A. IRVING STEMBERG, OF SAME PLACE.

IMPROVEMENT IN METHODS OF FASTENING PULLEY AND WHEEL HUBS TO SHAFTS.

Specification forming part of Letters Patent No. 116,228, dated June 20, 1871.

*To all whom it may concern:*

Be it known that I, EDWARD G. SHORTT, of Carthage, in the county of Jefferson and State of New York, have invented a new and Improved Apparatus for Fastening Pulley and Wheel Hubs to Shafts; and I do hereby declare the following to be a full, clear, and exact description of the same, reference being had to the accompanying drawing making a part of this specification, in which—

Figure 1:
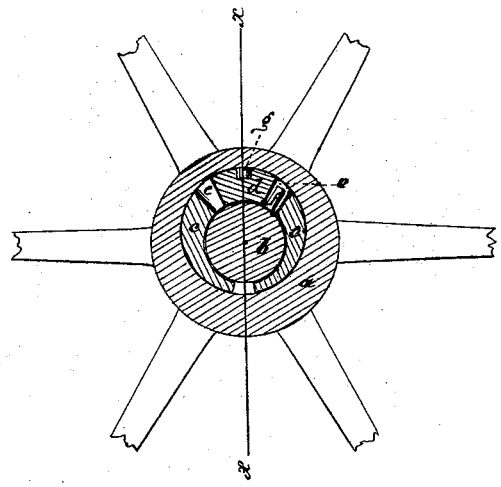
Figure 2:
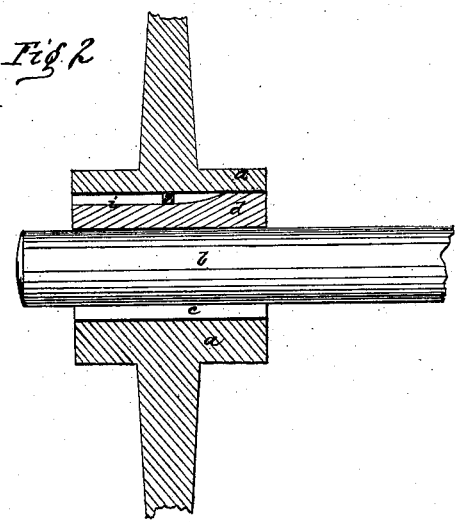

Figure 1 is a transverse vertical section, and Fig. 2 is a longitudinal vertical section in the line $x$ $x$, Fig. 1.

This invention consists in a hub provided with an eccentric bore, and combined with wedges running lengthwise of the hub, and curved and tapering in cross-section, and with a key which fits between the wider edges or heads of the curved wedges within the hub, which key, when drawn into the hub, causes the wedges to clamp and center the axle.

Referring to the drawing, $a$ is the hub, having an eccentric bore. $b$ is the axle, which is centered in the hub by means of the wedges $c$ $c$ and the interposed tapering key $d$. The wedges are provided with recesses $e$ in their wider edges, into either of which recesses extends a pin, $f$, from the axle, said pin preventing the axle from turning independently of the bushing within the hub. The pin $f$ may be taken out of one hole in the axle and inserted in the other, so as to enter the other recess $e$. The key $d$ is inserted between the wedges next to the narrowest part of the hub. Said key is grooved lengthwise of its outer side, as shown at $i$, which groove a pin, $g$, extending from the hub, enters, thus preventing the wedge from turning within the hub or swerving from a straight line as it is driven in. The key, as it enters between the wedges, forces the latter around into the narrowest part of the space between the axle and hub, thus causing them to clamp the axle firmly. The pin $f$, when placed in the axle opposite to the direction of the resistance, and the key $d$, when driven in, make the fastening absolutely self-compressing.

Having thus described my invention, what I claim as new, and desire to secure by Letters Patent, is—

The hub $a$ combined with the wedges $c$, slotted key $d$, pins $f$ $g$, and recesses $e$, as specified.

EDWARD G. SHORTT.

Witnesses:
 H. HOOKER,
 GEORGE GILBERT.